(12) United States Patent
Salter et al.

(10) Patent No.: US 12,547,362 B2
(45) Date of Patent: Feb. 10, 2026

(54) ENHANCED SIMULATED VISION (71) Applicant: Apple Inc., Cupertino, CA (US)

(72) Inventors: Thomas G. Salter, San Francisco, CA (US); Christopher I. Word, San Francisco, CA (US); Jeffrey S. Norris, Saratoga, CA (US); In Young Yang, Kirkland, WA (US); Michael R. Alger, Mountain View, CA (US); Michael J. Rockwell, Palo Alto, CA (US); Anshu K. Chimalamarri, Sunnyvale, CA (US); Evan M. Bovie, San Francisco, CA (US); Thomas J. Moore, Northglenn, CO (US); Yifeng Gui, Monte Sereno, CA (US); Devin W. Chalmers, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/892,082

(22) Filed: Sep. 20, 2024

(65) Prior Publication Data

US 2025/0103264 A1    Mar. 27, 2025

Related U.S. Application Data

(60) Provisional application No. 63/585,921, filed on Sep. 27, 2023, provisional application No. 63/691,976, filed on Sep. 6, 2024.

(51) Int. Cl.
*G09G 5/00* (2006.01)
*G06F 1/16* (2006.01)
*G06F 3/14* (2006.01)
*G06F 3/01* (2006.01)

(52) U.S. Cl.
CPC ............. *G06F 3/14* (2013.01); *G06F 1/163* (2013.01); *G06F 3/013* (2013.01)

(58) Field of Classification Search
CPC ... G06T 19/006; G06T 19/20; G02B 27/0093; G02B 27/0172; G02B 27/017; G02B 2027/014; G06F 3/011; G06F 3/013; G06F 3/017; G06F 3/14; G06F 1/163; G06F 3/147; G06Q 30/0631; G06V 20/20; G09G 5/377; G09G 3/2003
USPC .......................................................... 345/7
See application file for complete search history.

(56) References Cited

U.S. PATENT DOCUMENTS

| 11,592,674 B2 | 2/2023 | Price et al. | |
|---|---|---|---|
| 2022/0201239 A1* | 6/2022 | Price | H04N 9/646 |
| 2023/0215304 A1* | 7/2023 | Nicholson | G09G 3/002 |
| | | | 345/697 |
| 2023/0260228 A1* | 8/2023 | Jia | G09G 5/377 |
| | | | 345/633 |

\* cited by examiner

*Primary Examiner* — Jennifer T Nguyen
(74) *Attorney, Agent, or Firm* — Kubota & Basol LLP (57) ABSTRACT

Some examples of the disclosure are directed to systems and methods for selectively displaying an image of a portion of a physical environment of an electronic device with enhanced visibility. In some examples, the image is displayed overlaid on a portion of a view of the physical environment. In some examples, the electronic device displays the image in accordance with one or more first criteria being satisfied. In some examples, the electronic device forgoes displaying the image in accordance with the one or more criteria not being satisfied.

24 Claims, 7 Drawing Sheets

ENHANCED SIMULATED VISION

CROSS-REFERENCE TO RELATED APPLICATIONS

This application claims the benefit of U.S. Provisional Application No. 63/585,921, filed Sep. 27, 2023, and U.S. Provisional Application No. 63/691,976, filed Sep. 6, 2024, the contents of which are herein incorporated by reference in their entireties for all purposes.

FIELD OF THE DISCLOSURE

This relates generally to systems and methods of presenting extended reality environments and, more particularly, to displaying one or more images of a physical environment while presenting an extended reality environment.

BACKGROUND OF THE DISCLOSURE

Some computer graphical environments provide two-dimensional and/or three-dimensional environments where at least some objects presented for a user's viewing are virtual and generated by a computer. In some examples, computer graphical environments can be based on one or more images of the physical environment of the computer.

SUMMARY OF THE DISCLOSURE

This relates generally to systems and methods of presenting extended reality environments and, more particularly, to displaying one or more images of a physical environment while presenting an extended reality environment. In some examples, presenting the extended reality environment with an electronic device includes presenting pass-through video of the physical environment of the electronic device. As described herein, for example, presenting pass-through video can include displaying virtual or video passthrough in which the electronic device uses display to display images of the physical environment. In some examples, presenting the extended reality environment with an electronic device includes presenting true or real optical see-through in which portions of the physical environment are visible to the user through a transparent portion of the display. In some situations, the level of light (e.g., brightness) in the physical environment of the electronic device may be too low for the user to see the physical environment clearly. In some examples, in response to detecting that one or more criteria are satisfied, the electronic device can display one or more (e.g., still and/or video) images of a portion of the physical environment at an increased level of brightness, enabling the user to more easily see the portion of the physical environment. Example criteria include detecting that the level of brightness of the physical environment is below a predefined threshold, receiving a user input, and criteria based on contextual data about the physical environment.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

This relates generally to systems and methods of presenting extended reality environments and, more particularly, to displaying one or more images of a physical environment while presenting an extended reality environment. In some examples, presenting the extended reality environment with an electronic device includes presenting pass-through video of the physical environment of the electronic device. As described herein, for example, presenting pass-through video can include displaying virtual or video passthrough in which the electronic device uses display to display images of the physical environment. In some examples, presenting the extended reality environment with an electronic device includes presenting true or real optical see-through in which portions of the physical environment are visible to the user through a transparent portion of the display. In some situations, the level of light (e.g., brightness) in the physical environment of the electronic device may be too low for the user to see the physical environment clearly. In some examples, in response to detecting that one or more criteria are satisfied, the electronic device can display one or more (e.g., still and/or video) images of a portion of the physical environment at an increased level of brightness, enabling the user to more easily see the portion of the physical environment. Example criteria include detecting that the level of brightness of the physical environment is below a predefined threshold, receiving a user input, and criteria based on contextual data about the physical environment.

In some examples, a three-dimensional object is displayed in a computer-generated three-dimensional environment with a particular orientation that controls one or more behaviors of the three-dimensional object (e.g., when the three-dimensional object is moved within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object).

In some examples, a three-dimensional object can be displayed in the three-dimensional environment in a world-locked orientation, a body-locked orientation, a tilt-locked orientation, or a head-locked orientation, as described below. As used herein, an object that is displayed in a body-locked orientation in a three-dimensional environment has a distance and orientation offset relative to a portion of the user's body (e.g., the user's torso). Alternatively, in some examples, a body-locked object has a fixed distance from the user without the orientation of the content being referenced to any portion of the user's body (e.g., may be displayed in the same cardinal direction relative to the user, regardless of head and/or body movement). Additionally or alternatively, in some examples, the body-locked object may be configured to always remain gravity or horizon (e.g., normal to gravity) aligned, such that head and/or body changes in the roll direction would not cause the body-locked object to move within the three-dimensional environment. Rather, translational movement in either configuration would cause the body-locked object to be repositioned within the three-dimensional environment to maintain the distance offset.

As used herein, an object that is displayed in a head-locked orientation in a three-dimensional environment has a distance and orientation offset relative to the user's head. In some examples, a head-locked object moves within the three-dimensional environment as the user's head moves (as the viewpoint of the user changes).

As used herein, an object that is displayed in a world-locked orientation in a three-dimensional environment does not have a distance or orientation offset relative to the user.

As used herein, an object that is displayed in a tilt-locked orientation in a three-dimensional environment (referred to herein as a tilt-locked object) has a distance offset relative to the user, such as a portion of the user's body (e.g., the user's torso) or the user's head. In some examples, a tilt-locked object is displayed at a fixed orientation relative to the three-dimensional environment. In some examples, a tilt-locked object moves according to a polar (e.g., spherical) coordinate system centered at a pole through the user (e.g., the user's head). For example, the tilt-locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt-locked object would follow the head tilt and move radially along a sphere, such that the tilt-locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt-locked object is not repositioned within the three-dimensional environment.

Figure 1:
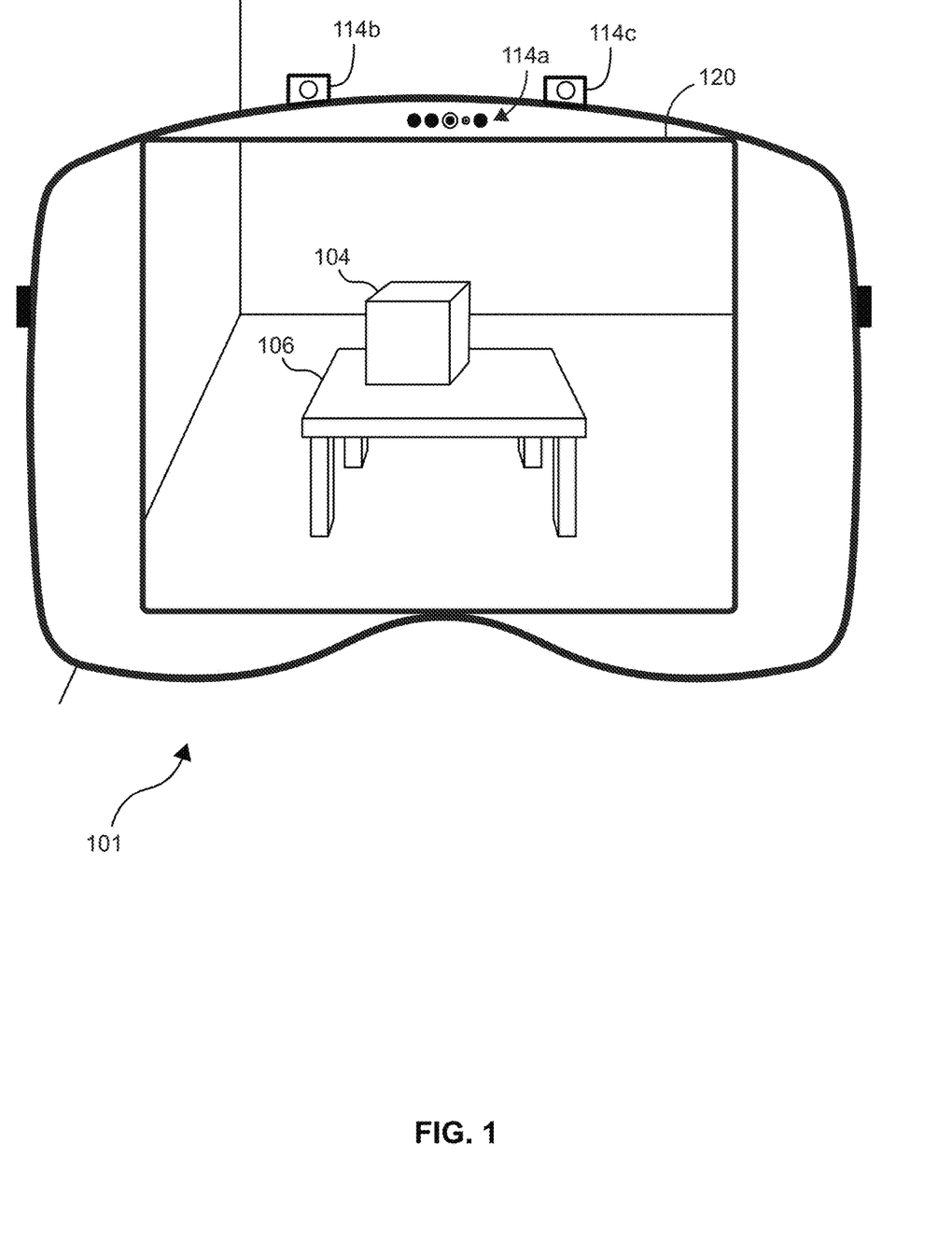
FIG. 1 illustrates an electronic device presenting an extended reality environment according to some examples of the disclosure.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors 114a oriented towards a face of the user (e.g., eye tracking cameras described below with reference to FIG. 2). In some examples, internal image sensors 114a are used for eye tracking (e.g., detecting a gaze of the user). Internal image sensors 114a are optionally arranged on the left and right portions of display 120 to enable eye tracking of the user's left and right eyes. In some examples, electronic device 101 also includes external image sensors 114b and 114c facing outwards from the user to detect and/or capture the physical environment of the electronic device 101 and/or movements of the user's hands or other body parts.

In some examples, display 120 has a field of view visible to the user (e.g., that may or may not correspond to a field of view captured by external image sensors 114b and 114c). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-pass-through device in which display 120 is an opaque display configured to display images of the physical environment captured by external image sensors 114b and 114c.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
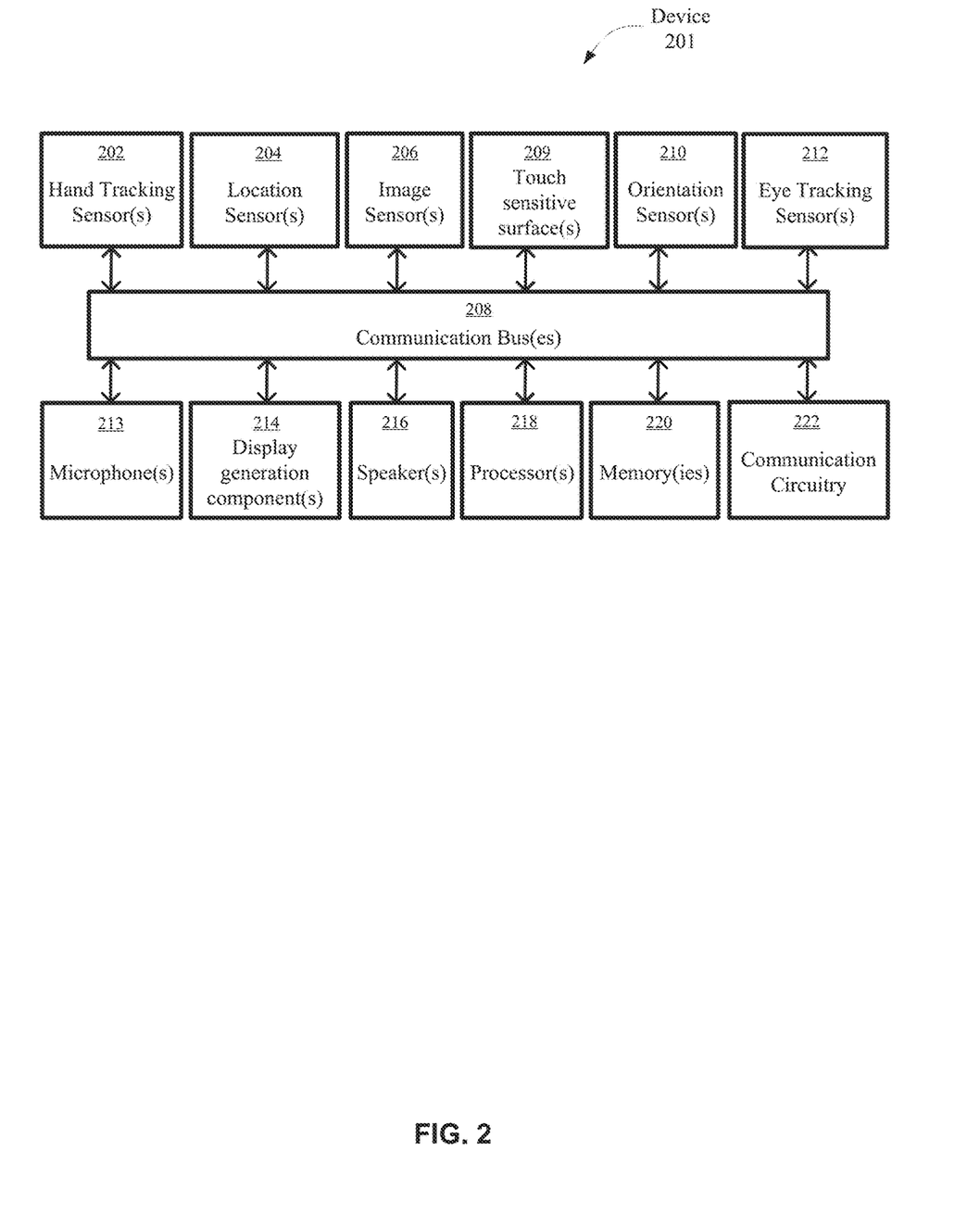
FIG. 2 illustrates a block diagram of an example architecture for a device according to some examples of the disclosure.

FIG. 2 illustrates a block diagram of an example architecture for an electronic device 201 according to some examples of the disclosure. In some examples, electronic device 201 includes one or more electronic devices. For example, the electronic device 201 may be a portable device, an auxiliary device in communication with another device, a head-mounted display, etc., respectively. In some examples, electronic device 201 corresponds to electronic device 101 described above with reference to FIG. 1.

As illustrated in FIG. 2, the electronic device 201 optionally includes various sensors, such as one or more hand tracking sensors 202, one or more location sensors 204, one or more image sensors 206 (optionally corresponding to internal image sensors 114a and/or external image sensors 114b and 114c in FIG. 1), one or more touch-sensitive surfaces 209, one or more motion and/or orientation sensors 210, one or more eye tracking sensors 212, one or more microphones 213 or other audio sensors, one or more body tracking sensors (e.g., torso and/or head tracking sensors), one or more display generation components 214, optionally corresponding to display 120 in FIG. 1, one or more speakers 216, one or more processors 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays. In some examples, display generation component(s) 214 can include a display with touch capability (e.g., a touch screen), a projector, a holographic projector, a retinal projector, a transparent or translucent display, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a global positioning system (GPS) receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 (and/or other body tracking sensor(s), such as leg, torso, and/or head tracking sensor(s)) can use image sensor(s) 206 (e.g., one or more IR cameras, 3D cameras, depth cameras, etc.) that capture three-dimensional information from the real-world including one or more body parts (e.g., leg, torso, head, or hands of a human user). In some examples, the hands can be resolved with sufficient resolution to distinguish fingers and their respective positions. In some examples, one or more image sensors 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic device 201 is not limited to the components and configuration of FIG. 2, but can include fewer, other, or additional components in multiple configurations. In some examples, electronic device 201 can be implemented between two electronic devices (e.g., as a system). In some such examples, each of (or more) electronic device may each include one or more of the same components discussed above, such as various sensors, one or more display generation components, one or more speakers, one or more processors, one or more memories, and/or communication circuitry. A person or persons using electronic device 201, is optionally referred to herein as a user or users of the device.

Figure 3A:
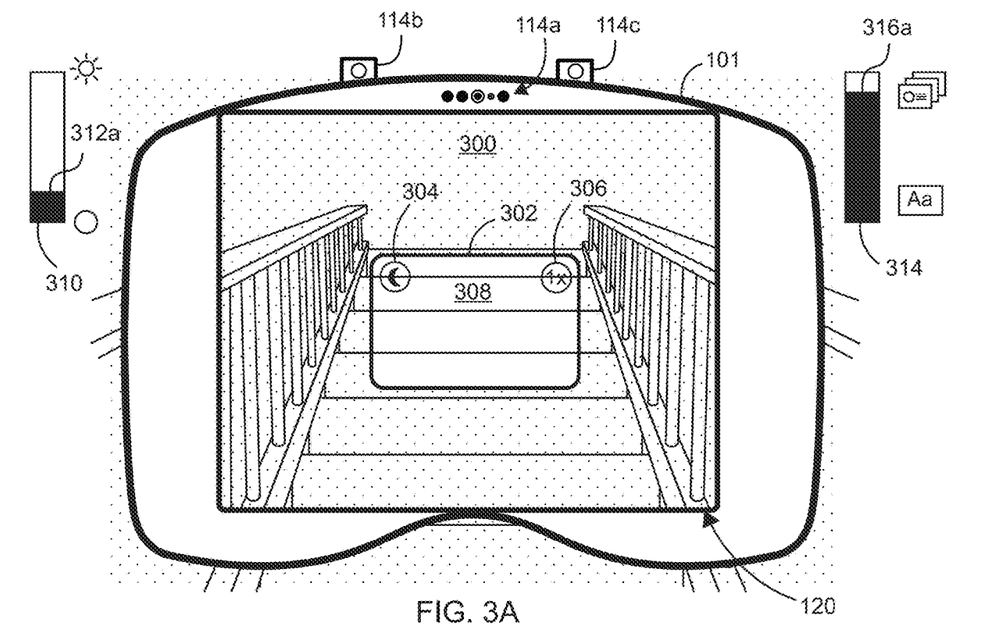
FIGS. 3A-3B illustrate an electronic device displaying an image of a portion of the physical environment of the electronic device according to some examples of the disclosure.
Figure 3B:
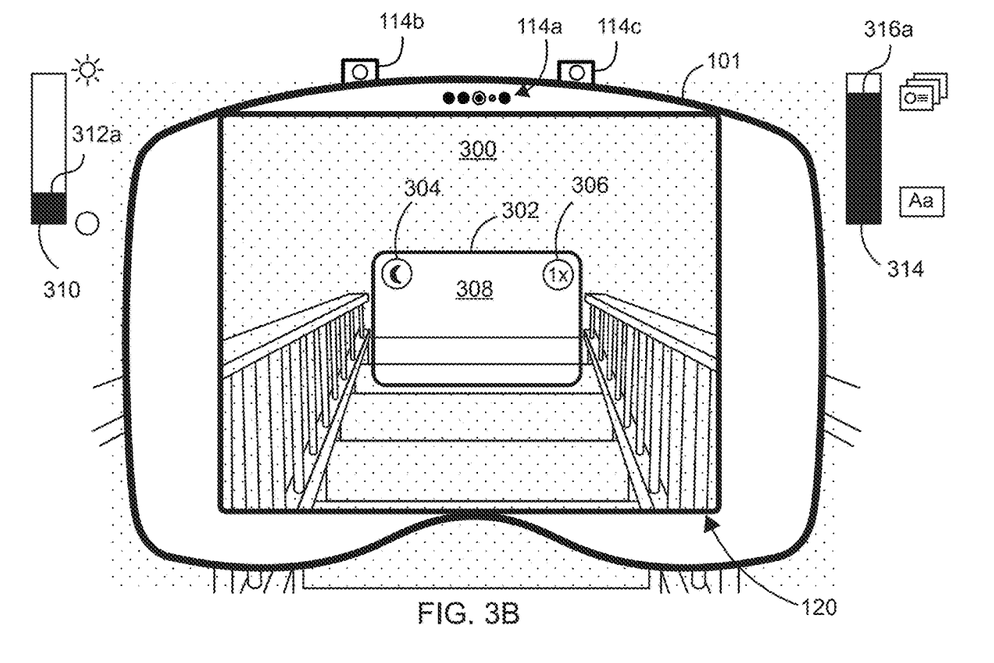

FIGS. 3A-3B illustrate an electronic device 101 displaying an image 308 of a portion of the physical environment of the electronic device according to some examples of the disclosure. For example, the electronic device 101 is optionally of the same architecture as electronic device 101 and/or electronic device 201 described above with reference to FIG. 1 and/or FIG. 2, respectively.

In the example shown in FIG. 3A, the electronic device 101 operates in a physical environment with a relatively low ambient light level. The level of ambient light 312a in this example is indicated by scale 310. For example, the electronic device 101 is operating outdoors during nighttime with no artificial lighting or relatively low artificial lighting (and/or with insufficient moonlight). The current level of ambient light 312a can be below a predefined threshold. The electronic device 101 optionally presents a three-dimensional environment 300 that includes a view and/or a representation of the physical environment. For example, in FIG. 3A, the electronic device 101 presents a view of a set of stairs in the physical environment of the electronic device 101. Presenting the three-dimensional environment 300 optionally includes displaying virtual elements, such as image 308 described in more detail below and/or displaying representations of real objects in the physical environment using video or virtual passthrough. Presenting the three-dimensional environment 300 optionally includes presenting a view of the physical environment through a transparent portion of the display generation component 120 using true or real optical see-through.

Figure 7:
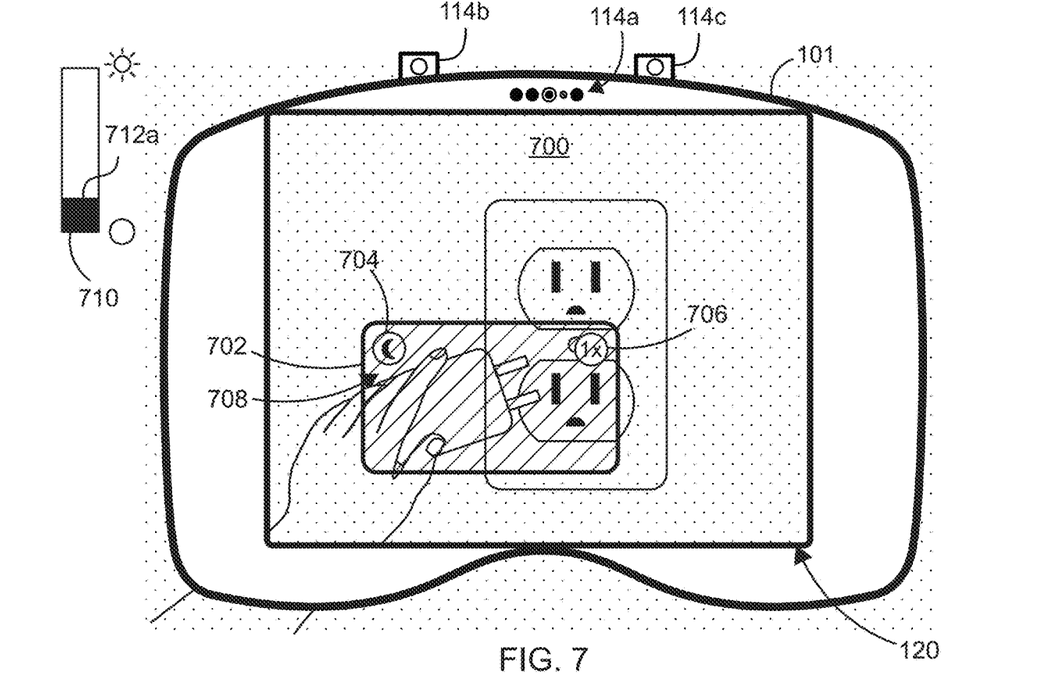
FIG. 7 illustrates an example of the electronic device presenting image with enhanced visibility including a color filter according to some examples of the disclosure.
Figure 8:
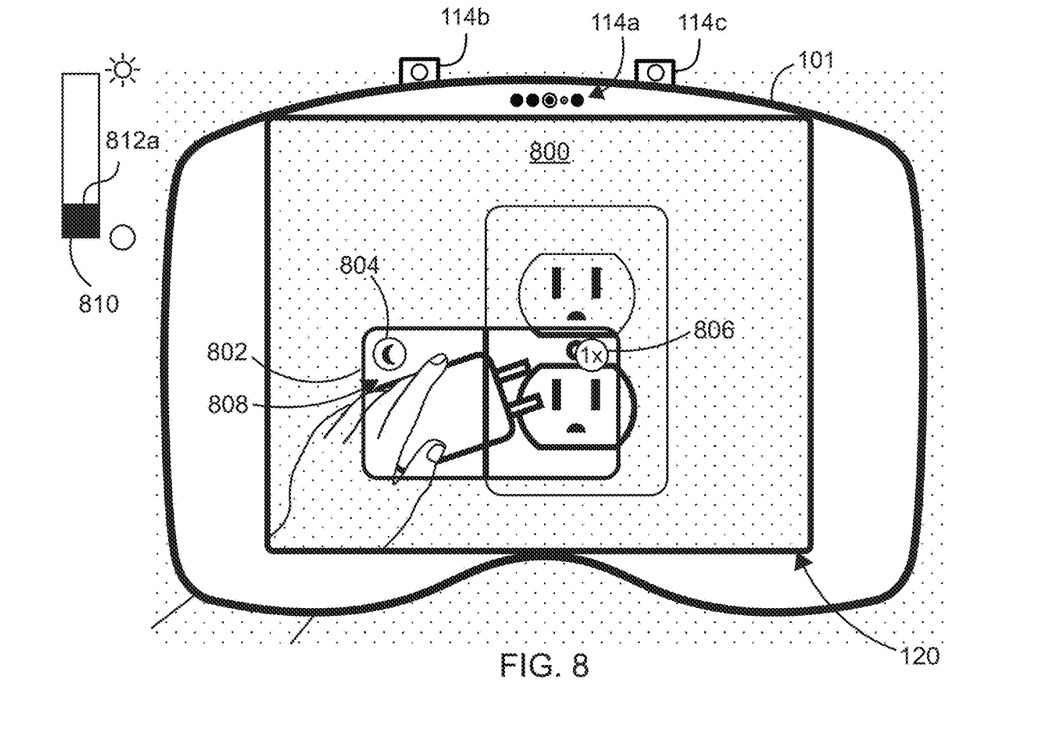
FIG. 8 illustrates an example of the electronic device presenting image with enhanced visibility including edge enhancement according to some examples of the disclosure

In situations in which the level of ambient light is below the predefined threshold, such as in FIG. 3A, the electronic device 101 optionally displays a user interface element 302 including an image 308 of a portion of the physical environment of the electronic device 101. In some examples, the image 308 has enhanced visibility compared to the visibility of the portion of the physical environment presented using the display generation component 120 without displaying the image. In some examples, the image 308 has enhanced visibility compared to the visibility of the portion of the physical environment viewed without the electronic device 101. Enhanced visibility optionally includes one or more of increased brightness, contrast, color saturation, sharpness and/or clarity. Additionally or alternatively, enhanced visibility optionally includes the application of a color filter as shown in FIG. 7 and/or object edge enhancement techniques as shown in FIG. 8.

In some examples, the electronic device 101 displays images of the physical environment in one or more contexts other than in the context of providing enhanced visibility in a low-level ambient light environment, such as the environment of FIG. 3A for example. For example, the electronic device 101 uses a camera application to capture images (e.g., still images or videos) of the physical environment. In some examples, the electronic device 101 applies image processing to image 308 (and other visibility-enhancing images according to the disclosure) to enhance the visibility of image 308 that the electronic device 101 does not apply to images of the physical environment captured in other contexts, such as when using the camera application to capture photos. In some examples, the electronic device 101 applies image processing to increase the brightness, color saturation, color contrast, and/or sharpness of image 308 to a greater extent to which the electronic device 101 applies one or more of these techniques to images of the physical environment in other contexts, such as when using a camera application to capture and/or edit photos for a photo application. For example, the electronic device 101 applies fewer of these techniques, applies these techniques to a lesser extent, or does not apply these techniques to images of the physical environment, such as images displayed in a camera application and/or a photo application. In some examples, images displayed in a camera application are processed to the extent they reproduce or emulate the appearance of the physical environment, whereas images displayed to enhance visibility are processed to have a different (e.g., more visible) appearance than the appearance of the physical environment.

In some examples, the electronic device 101 displays the image 308 of the portion of the physical environment in accordance with a determination that one or more first criteria are satisfied. The one or more first criteria optionally include a criterion that is satisfied when the electronic device 101 receives a user input requesting display of the image 308. For example, the electronic device 101 displays the image 308 on demand in response to receiving the input. Example inputs include inputs received via hardware input devices; gaze detection; detecting air gestures or other movements of the user's fingers, hands, and/or arms; and/or voice inputs. As another example, the electronic device 101 displays the image 308 in response to a setting being active on the electronic device 101 that includes displaying the image 308 in response to detecting one or more of the other first criteria described herein. The electronic device 101 optionally activates the setting in response to receiving one or more user inputs.

The one or more first criteria optionally include a criterion that is satisfied when the current level of ambient light 312a is below a predefined threshold level. For example, the predefined threshold level corresponds to an amount of ambient light at which visibility is reduced. In some examples, the predefined threshold level is a system setting of the electronic device 101 that the user cannot change. In some examples, the predefined threshold level is a user setting of the electronic device 101 that the user is able to change. In some examples, the predefined threshold level is static, optionally unless and until the user adjusts the threshold by changing a setting. In some examples, the predefined threshold level is dynamic depending on a time-windowed average amount of ambient light in which the predefined threshold changes according to a predefined function based on the current level of ambient light 312a and/or a history of levels of ambient light (e.g., last 5 seconds, last 30 seconds, last 60 seconds, etc.). For example, if the electronic device 101 moves from a well-lit room to a dark environment, the predefined threshold level may start at an initial value and may decrease as the electronic device 101 remains in the dark environment because the user's eyes may gradually adjust to the dark. In some examples, the electronic device 101 adjusts the predefined threshold level in response to detecting the user's eyes adapt to changes in the amount of ambient light. For example, in response to the user moving from the well-lit room to the dark environment, the electronic device 101 detects the adaptation of the user's eyes to the dark (e.g., by measuring the diameter or the user's pupils) and adjusts (e.g., decreases) the predefined threshold in response to detecting the user's eyes adjust to the dark.

The one or more first criteria optionally include criteria based on the context of the physical environment of the electronic device 101. For example, in FIG. 2A, the user is wearing the electronic device 101 while walking near stairs in a dark environment. In this context (an uneven or obstructed path), the user may wish to view an image 308 of the physical environment with enhanced visibility, such as to avoid falling. The electronic device 101 optionally uses movement data, gaze tracking data, a semantic understanding of one or more captured images of the physical environment, movement speed, movement acceleration, and/or location data to determine the context of the physical environment of the electronic device 101. For example, the electronic device uses one or more of these factors to determine the heading of the user and whether there are obstacles in the user's path of motion. The electronic device 101 optionally uses an algorithm and/or machine learning techniques to determine whether the context corresponds to displaying the image 308 or not.

In some examples, the user interface element 302 further includes a zoom option 306 overlaid on the image 308. For example, in response to detecting an input selecting the zoom option 306, the electronic device 101 displays a plurality of options corresponding to different levels of zoom. In response to detecting selection of one of the options corresponding to a different level of zoom, the electronic device 101 zooms the image 308 in or out corresponding to the selected zoom level, for example. Example levels of zoom available include 0.5x, 1x, 1.5x, 2x, 3x, and/or 5x. In some examples, the user interface element 302 further includes an indication 304 of low light level overlaid on the image 308. In some examples, the electronic device 101 displays the low light indication 304 in response to detecting that the current level of ambient light 312a is less than the predefined threshold level described above.

In some examples, the image 308 includes video corresponding to the portion of the physical environment over which the electronic device 101 overlays the user interface element 302. For example, the video is a live video feed or near-live video feed (e.g., with less than a threshold delay, such as 1 ms, 50 ms, etc.). As shown in FIG. 3B, in response to detecting the position of the electronic device 101 change relative to the physical environment, the electronic device 101 updates the image 308 included in user interface element 302 to correspond to the updated view of the physical environment. In some examples, as shown in FIGS. 3A-3B, the electronic device 101 displays the user interface element 302 overlaid on a portion of the physical environment depicted in image 308. In some examples, the electronic device 101 displays the image 308 with less brightness than the amount of brightness that would be used to display images and/or other user interface elements in environments with a greater amount of ambient light than the amount of ambient light 312a in FIGS. 3A-3B, as described in more detail below with reference to FIG. 6.

In some examples, the electronic device 101 modifies the frame rate and amount of fidelity of the video of image 308 depending on the context of the physical environment of the electronic device 101. The electronic device 101 optionally makes a tradeoff between frame rate and video/image fidelity indicated by scale 314 depending on the context of the physical environment. In the example of FIGS. 3A-3B, the electronic device 101 displays the video of image 308 with a relatively high frame rate and relatively low fidelity, indicated by value 316a of scale 314. For example, frame rate may be more important in the context of walking down stairs in the dark shown in FIGS. 3A-3B to assist the user in moving in the physical environment. In some examples, the electronic device 101 determines that the context corresponds to a high frame rate and low fidelity using one or more second criteria corresponding to favoring frame rate over picture fidelity. The second criteria are optionally based on motion data, gaze data, a semantic understanding of images of the physical environment, and/or location data of the electronic device 101. Additional or alternative contexts in which the one or more second criteria are satisfied are possible. It should be understood that scale 314 and other scales used herein are shown for illustrative purposes and not necessarily displayed by the electronic device 101.

For example, in FIGS. 3A-3B, motion data captured by the electronic device 101 indicates that the user is moving greater than a threshold amount. The electronic device 101 optionally captures the motion data using an IMU, one or more cameras, and/or other motion sensor(s). In some examples, detecting motion above the threshold amount corresponds to increasing the frame rate of the video of image 308. Increasing the frame rate in accordance with detecting motion above a threshold amount can be advantageous in maintaining the correspondence of the image 308 to the portion of the physical environment on which the user interface element 302.

As another example, in FIGS. 3A-3B, gaze data captured by the electronic device 101 indicates that the user is not reading or attempting to understand fine details of a portion of the physical environment. For example, gaze data that corresponds to reading may have particular characteristics the electronic device 101 is able to detect algorithmically and when these characteristics are not detected, the electronic device 101 optionally determines that the user is not reading. As another example, the gaze data may correspond to the user attempting to use their vision to walk steadily in the physical environment. The electronic device 101 optionally captures the gaze data using one or more cameras, other eye sensor(s) and/or other gaze detection sensors. In some examples, detecting gaze data not corresponding to reading or viewing fine details corresponds to decreasing the fidelity of the picture quality, which optionally enables the electronic device 101 to increase the frame rate of the video of image 308.

As another example, in FIGS. 3A-3B, the electronic device 101 uses location data to make the tradeoff between image fidelity and frame rate. The electronic device 101 optionally uses global positioning satellite (e.g., GPS) sensor(s) and/or other location sensor(s) and/or connections to other electronic devices through wireless network(s) (e.g., Bluetooth and/or WiFi) to determine the current location of the electronic device 101. In some examples, the electronic device 101 determines whether or not the current location of the electronic device 101 corresponds to location(s) where the user is likely to prefer high fidelity or high frame rate for the video content of image 308.

As another example, in FIGS. 3A-3B, the electronic device 101 captures one or more images of the physical environment of the electronic device 101 and uses a semantic understanding of the environment to determine that a relatively high frame rate is more important than preserving fidelity of picture quality. For example, the electronic device 101 uses algorithm(s) and/or machine learning technique(s) to identify features of the physical environment, such as the stairs. Additionally or alternatively, in some examples, the electronic device 101 uses semantic understanding to analyze other data related to the tradeoff between image fidelity and frame rate, such as movement, gaze, and location data.

FIGS. 3A-3B illustrate the electronic device 101 displaying image 308 within user interface element 302. Additionally or alternatively, in some examples, the electronic device 101 is capable of displaying one or more image(s) outlining the edges of objects in the physical environment or otherwise annotating portions of the physical environment for improved situational awareness in low light environments. For example, the electronic device 101 could display an outline of the stairs and/or handrail in the physical environment depicted in FIGS. 3A-3B. In some examples, the electronic device 101 displays the image(s) outlining the edges of objects in the physical environment with one or more of the characteristics described above with reference to image 308, such as displaying the image(s) in response to detecting the ambient light (represented on scale 310 in FIGS. 3A-3B) being less than a threshold amount and/or displaying the image(s) with a frame rate and image fidelity tradeoff selected based on one or more criteria described above. Additional examples of enhancing the presentation of the edges of objects in the real environment of the electronic device are described below with reference to FIG. 8.

Figure 4:
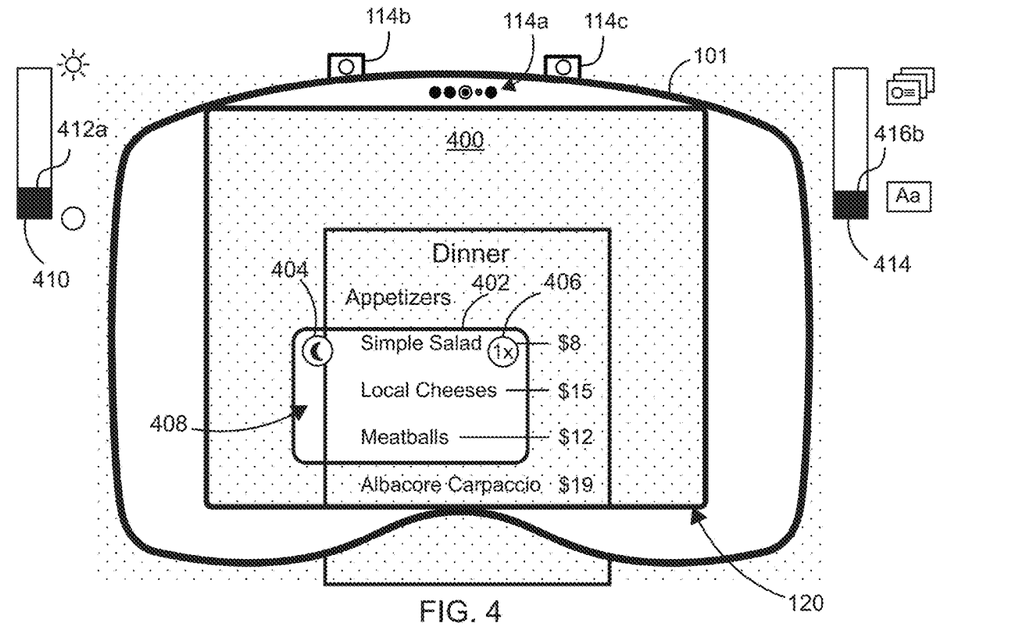
FIG. 4 illustrates an electronic device displaying an image of a portion of the physical environment of the electronic device according to some examples of the disclosure.

FIG. 4 illustrates an electronic device 101 displaying an image 408 of a portion of the physical environment of the electronic device 101 according to some examples of the disclosure. For example, the electronic device 101 is optionally of the same architecture as electronic device 101 and/or electronic device 201 described above with reference to FIG. 1 and/or FIG. 2, respectively.

In some examples, the electronic device 101 displays image 408 in a manner similar to the manner in which the electronic device 101 displays image 308 in FIGS. 3A-3B. For example, the electronic device 101 displays the image 408 in accordance with a determination that the one or more first criteria similar to those described above are satisfied, including criteria based on the amount 412a of ambient light indicated by scale 410, criteria based on receiving one or more inputs, and/or criteria based on the context of the physical environment of the electronic device 101 in FIG. 4. Additionally, as shown in FIG. 4, the electronic device 101 displays the image 408 in user interface element 402 similar to user interface element 302 that includes indication 404 similar to indication 304 and option 406 similar to option 306. In some examples, the electronic device 101 displays image 408 with less brightness than the amount of brightness the electronic device 101 uses to display image(s) and/or other user interface elements while the electronic device 101 is in an environment with more ambient light than the amount of ambient light 412a (represented on scale 410) in FIG. 4. In some examples, the electronic device 101 displays the user interface element 402 overlaid on a view of the portion of the physical environment represented by the image 408.

The context of the physical environment in FIG. 4 is different from the context of the physical environment in FIGS. 3A-3B. For example, in FIG. 4, the user of the electronic device 101 is optionally reading a menu in a dimly lit restaurant (or generally reading text in an environment with insufficient lighting). In some examples, the electronic device 101 identifies that the context of FIG. 4 corresponds to displaying video of image 408 with higher fidelity and lower frame rate, as indicated by value 416b of scale 414, based on one or more third criteria being satisfied. For example, because the user is likely trying to read in context of FIG. 4, the fidelity of the video of image 408 may be more important than the frame rate. In some examples, the third criteria are optionally based on motion data, gaze data, a semantic understanding of images of the physical environment, and/or location data of the electronic device. Additional or alternative contexts in which the one or more third criteria are satisfied are possible.

For example, in FIG. 4, motion data captured by the electronic device 101 indicates that the user is moving less than a threshold amount. In some examples, the motion data captured by electronic device 101 indicates that the stability of the user's head/gaze/overall location is at least a threshold amount. For example, detecting that the user is moving their hands could still include overall movement of the user under the threshold amount. The electronic device 101 optionally captures the motion data using one or more of the sensor(s) listed above with reference to FIGS. 3A-3B. In some examples, detecting motion below the threshold amount corresponds to increasing the image fidelity of the video of image 408. Increasing the image fidelity in accordance with detecting motion below the threshold amount can be advantageous in enabling the user to read objects in the physical environment of the electronic device 101, such as a menu in a restaurant.

As another example, in FIG. 4, gaze data captured by the electronic device 101 indicates that the user is reading an object in a portion of the physical environment. For example, the gaze of the user moves in a pattern associated with reading. As another example, the gaze data may not correspond to the user attempting to use their vision to walk steadily in the physical environment. The electronic device 101 optionally captures the gaze data using one or more of the sensors listed above with reference to FIGS. 3A-3B. In some examples, detecting gaze data corresponding to reading or viewing fine details corresponds to increasing the fidelity of the picture quality, which optionally causes the electronic device 101 to decrease the frame rate of the video of image 408.

As another example, in FIG. 4, the electronic device 101 uses location data to make the tradeoff between image fidelity and frame rate. The electronic device 101 optionally uses one or more of the sensors listed above with reference to FIGS. 3A-3B to determine the current location of the electronic device 101. In some examples, the electronic device 101 determines whether or not the current location of the electronic device 101 corresponds to location(s) where the user is likely to prefer high fidelity or high frame rate for the video content of image 408. For example, the electronic device 101 optionally determines the user is in a restaurant in which the user is likely to wish to read a menu using a higher fidelity image 408 generated by the electronic device 101.

As another example, in FIG. 4, the electronic device 101 captures one or more images of the physical environment of the electronic device 101 and uses a semantic understanding of the environment to determine that preserving fidelity of picture quality is more important than frame rate. For example, the electronic device 101 uses algorithm(s) and/or machine learning technique(s) to identify features of the physical environment, such as writing on the menu. Additionally or alternatively, in some examples, the electronic device 101 uses semantic understanding to analyze other data related to the tradeoff between image fidelity and frame rate, such as movement, gaze, and location data.

Figure 5:
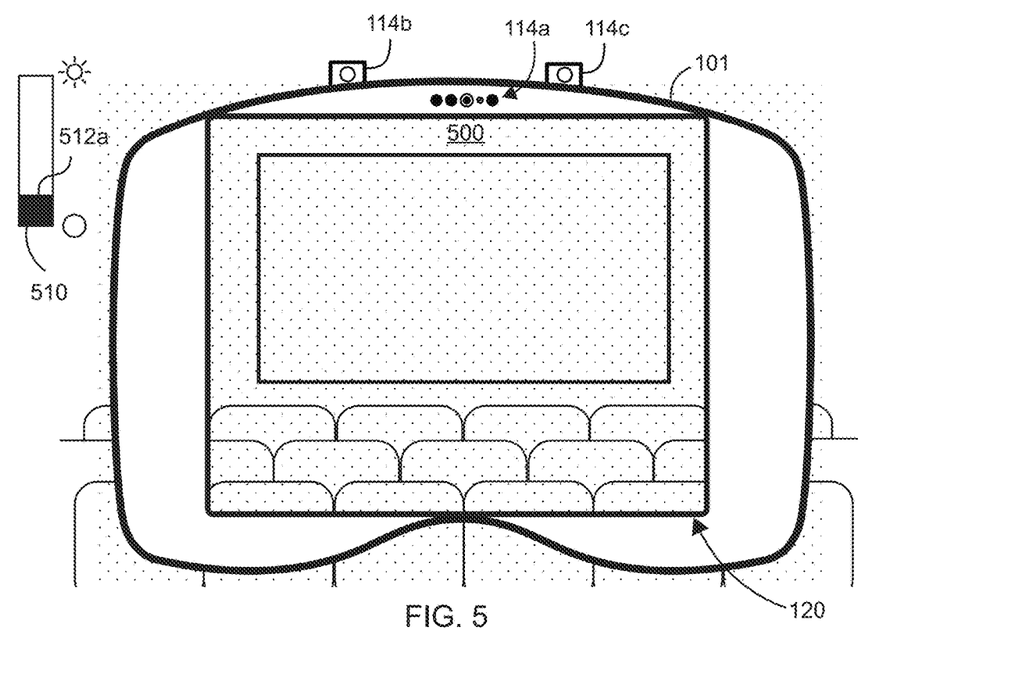
FIG. 5 illustrates an electronic device forgoing displaying an image of a portion of the physical environment with enhanced visibility based on the context of the physical environment of the electronic device according to some examples of the disclosure.

FIG. 5 illustrates an electronic device 101 forgoing displaying an image of a portion of the physical environment with enhanced visibility based on the context of the physical environment of the electronic device 101 according to some examples of the disclosure. Electronic device 101 in FIG. 5 is optionally of the same architecture of electronic device 101 described with reference to FIG. 1 and/or electronic device 201 described above with reference to FIG. 2.

In FIG. 5, the electronic device 101 operates in a physical environment of a movie theater. In some examples, this context is associated with forgoing display of an image of a portion of the environment with enhanced visibility (e.g., similar to image 308 in FIGS. 3A-3B and/or image 408 in FIG. 4). For example, in the context of a movie theater, the user may not wish to view an image of a portion of the environment with enhanced visibility because their vision may be adapted to the dark in order to see the movie.

In some examples, the electronic device 101 identifies the context based on one or more of the first criteria described above with reference to FIGS. 3A-4. The first criteria not satisfied in the example of FIG. 5 are optionally based on one or more of motion data, location data, receiving or not receiving one or more user inputs, and/or a semantic understanding of one or more images of the physical environment. For example, location data may indicate the electronic device 101 is being used in a movie theater and the electronic device 101 may automatically forgo display of the image of the portion of the environment with enhanced visibility in response to detecting the location of the electronic device 101 in or near a movie theater. As another example, the electronic device 101 may identify that the electronic device 101 is in a movie theater based on a semantic understanding of one or more captured images of the physical environment of the electronic device 101. As another example, the electronic device 101 may receive one or more inputs requesting that the electronic device 101 forgo displaying the image of the portion of the environment with enhanced visibility. For example, the electronic device 101 presents a prompt confirming that this feature should be disabled in response to the location data and/or semantic understanding of the image(s) of the physical environment and, while displaying the prompt, receives a user input turning off this feature. As another example, the electronic device 101 does not receive an input requesting to turn the feature on, so the electronic device 101 does not turn on the feature of displaying the image of the portion of the environment with enhanced visibility. Additional or alternative contexts in which the ambient light (represented by scale) is less than the predefined threshold yet the electronic device 101 forgoes displaying the image of the portion of the environment with enhanced visibility are possible.

Figure 6:
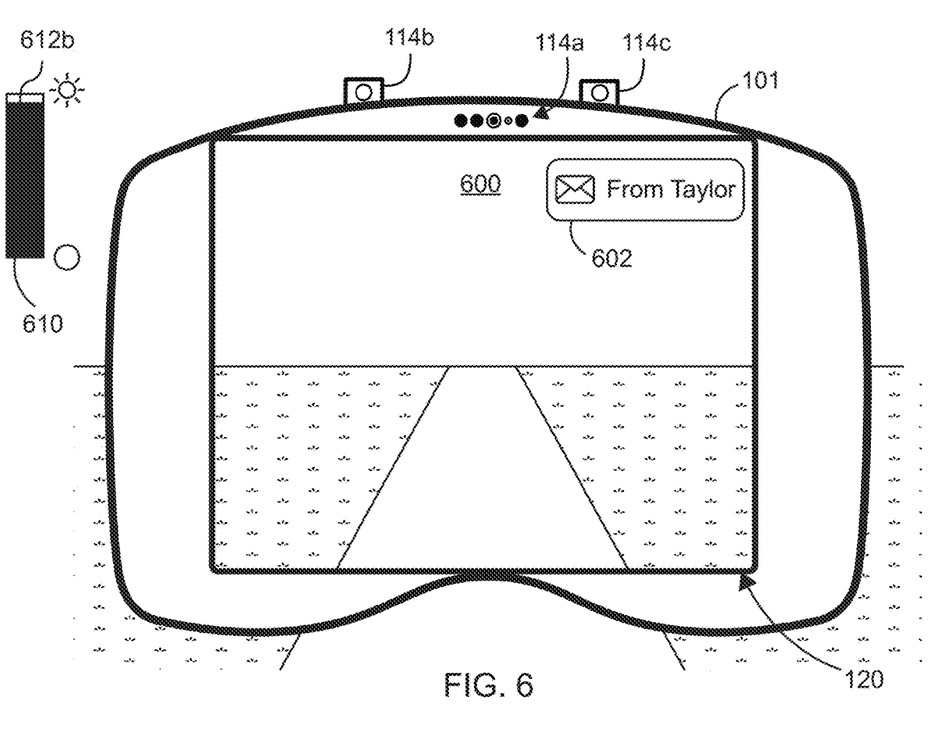
FIG. 6 illustrates an example of the electronic device forgoing display of an image of the portion of the environment with enhanced visibility in accordance with a determination that the amount of ambient light is above a predefined threshold according to some examples of the disclosure.

FIG. 6 illustrates an example of the electronic device 101 forgoing display of an image of the portion of the environment with enhanced visibility in accordance with a determination that the amount of ambient light as indicated by 612b (represented on scale 610) is above a predefined threshold according to some examples of the disclosure. Electronic device 101 in FIG. 6 is optionally of the same architecture of electronic device 101 described with reference to FIG. 1 and/or electronic device 201 described above with reference to FIG. 2.

In the example of FIG. 6, the electronic device 101 operates outside on a sunny day. In this example, the amount of ambient light 612b is greater than a predefined threshold. In some examples, in accordance with a determination that the amount of ambient light 612b is greater than the threshold, the electronic device 101 forgoes displaying the image of the portion of the environment with enhanced visibility (e.g., an image similar to image 308 in FIGS. 3A-3B and/or image 408 in FIG. 4). Additionally or alternatively, in some examples, the electronic device 101 forgoes displaying the image of the portion of the environment with enhanced visibility in response to receiving a user input requesting that the electronic device 101 forgoes displaying the image of the portion of the environment with enhanced visibility. Additionally or alternatively, in some examples, the electronic device 101 forgoes displaying the image of the portion of the environment with enhanced visibility in response to not receiving an input requesting display of the image.

As shown in FIG. 6, the electronic device 101 displays, overlaid on a view of the environment 600, a visual indication 602 of an incoming message received at the electronic device 101. In some examples, the electronic device 101 displays visual indication 602 with more brightness than the brightness used to display image 308 in FIGS. 3A-3B and/or the image 408 in FIG. 4. In some examples, the brightness of indication 602 is greater than the brightness of images 308 or 408 because the amount 612b of ambient light 610 is greater in FIG. 6 than it was in FIGS. 3A-3B or FIG. 4. In some examples, even if the ambient light amount is the same, the electronic device 101 displays images 308 and 408 with less brightness than the electronic device 101 would display other elements, such as indication 610. Additionally or alternatively, in some examples, the electronic device 101 displays a different virtual element with more brightness than image 308 in FIGS. 3A-3B and/or the image 408 in FIG. 4.

Thus, as described above, in some examples, an electronic device 101 provides enhanced low-light vision, including presenting an image of the physical environment of the electronic device 101 with enhanced visibility compared to the visibility of the physical environment without enhancement. In some examples, the electronic device 101 initiates the enhanced low-light vision feature in response to detecting that the level of ambient light is below a threshold amount and/or in response to receiving an input requesting initiation of the enhanced low-light vision feature. Additionally or alternatively, as described above with reference to FIGS. 3A-5, the electronic device 101 controls the tradeoff between the frame rate with which the electronic device 101 updates the enhanced image and the resolution of the enhanced image and/or whether or not to activate the enhanced low-light vision feature automatically (e.g., without receiving an input requesting initiation of the feature).

As described above, presenting the enhanced image of the physical environment of the electronic device 101 optionally includes adjusting the brightness, contrast, color saturation, sharpness, and/or clarity of the enhanced image. Optionally, the enhanced image is an image of a portion of the physical environment of the electronic device 101 visible through the display generation component 120, with other portions of the physical environment being presented without enhancement and/or with enhancement to a lesser degree. Additionally or alternatively, in some examples, the electronic device 101 applies a colored light filter (e.g., a red light filter) and/or edge enhancement to the enhanced image, as described in more detail below with reference to FIGS. 7-8. The electronic device 101 combines techniques described below with reference to FIGS. 7-8 with the techniques described above with reference to FIGS. 3A-6 in some examples.

FIG. 7 illustrates an example of the electronic device 101 presenting image 708 with enhanced visibility including a color filter according to some examples of the disclosure. In some examples, the electronic device 101 presents a user interface element 702 with an image 708 with enhanced visibility techniques including a color filter in combination with one or more of the techniques described above with reference to FIGS. 3A-6. For example, the electronic device 101 presents an image 708 including a color filter in one of the situations described above with reference to FIG. 3A-6 and/or the image 708 includes one or more additional characteristics described above with reference to FIGS. 3A-6. In some examples, the user interface element 702 further includes an indication 704 of low light similar to indication(s) 304 and/or 404 described above and zoom option 706 similar to zoom options(s) 306 and/or 406 described above.

In some examples, the color filter applied to image 708 presents certain colors and removes or reduces certain colors from the image 708. For example, the image 708 includes a red-light filter that presents the image 708 that includes red color(s) and/or excludes or reduces other colors (e.g., green (s) and/or blue(s)). Applying a red light filter can be advantageous because viewing red light does not impact the night vision of humans to the same extent that viewing other colors of light impacts the night vision of humans. In some situations, however, the electronic device 101 applies other color filter(s) to the image 708.

As described above, the electronic device 101 presents the image 708 with the color filter in situations such as those described above with reference to FIGS. 3A-6. For example, the electronic device 101 presents the image 708 in accordance with a determination that the current level of ambient light 712*a* in the physical environment of the electronic device 101 is less than a predefined threshold level, as indicated by scale 710 and/or in accordance with other determinations related to the physical environment of the electronic device 101, such as the context of the physical environment as described above. In some examples, the electronic device 101 applies the color filter in accordance with a user-defined setting, such as a setting that selects the visual effects for the electronic device 101 to apply to enhanced visibility images of the physical environment of the electronic device. Optionally, the setting includes available configuration(s) that combine one or more visual effects described herein for the electronic device 101 to apply to the enhanced visibility image of the physical environment.

FIG. 8 illustrates an example of the electronic device 101 presenting image 808 with enhanced visibility including edge enhancement according to some examples of the disclosure. In some examples, the electronic device 101 presents a user interface element 802 with an image 808 with enhanced visibility techniques including edge enhancement in combination with one or more of the techniques described above with reference to FIGS. 3A-7. For example, the electronic device 101 presents an image 808 including edge enhancement in one of the situations described above with reference to FIG. 3A-6 and/or the image 808 includes one or more additional characteristics described above with reference to FIGS. 3A-7. In some examples, the user interface element 802 further includes an indication 804 of low light similar to indication(s) 304, 404, and/or 704 described above and zoom option 806 similar to zoom options(s) 306, 406, and/or 706 described above.

In some examples, the edge enhancement the electronic device 101 applies to image 808 includes increasing visibility of the edge(s) of objects in the physical environment 800 of the electronic device 101. For example, the electronic device 101 displays the edges of objects in image 808 with highlighting, outlines, and/or other added visual enhancements not visible or less visible in the physical environment 800 without the use of electronic device 101. For example, the electronic device 101 adds images of the boundaries between objects in the environment 800 overlaid on the image 808 at locations corresponding to the boundaries between objects in the image 808. To facilitate edge enhancement, the electronic device 101 identifies edges of objects in the image 808 using an image processing algorithm.

In some examples, the electronic device 101 enhances the edges of all of the objects included in the image 808. In some examples, the electronic device 101 enhances the edges of some of the objects included in the image 808, but not others, based on one or more criteria. For example, the electronic device 101 enhances the edges of objects to which the attention (e.g., including gaze) of the user is directed and does not enhance the edges of other objects in the image 808 or enhances the edges of other objects in the image 808 to a lesser extent. As another example, the electronic device 101 enhances the edges of objects proximate to the hand(s) of the user (e.g., object(s) the user is touching with their hand(s) and/or pointing at) and does not enhance the edges of other objects in the image 808 or enhances the edges of other objects in the image 808 to a lesser extent. In some examples, if the image 808 includes the hand(s) of the user, as is the case in FIG. 8, the electronic device 101 displays the portion of the image 808 including the hand(s) without edge enhancement, such as in FIG. 8. In some examples, the electronic device 101 displays the portion of image 808 including the hand(s) of the user with edge enhancement.

As described above, the electronic device 101 presents the image 808 with edge enhancement techniques in situations such as those described above with reference to FIGS. 3A-7. For example, the electronic device 101 presents the image 808 in accordance with a determination that the current level of ambient light 812*a* in the physical environment of the electronic device 101 is less than a predefined threshold level, as indicated by scale 810 and/or in accordance with other determinations related to the physical environment of the electronic device 101, such as the context of the physical environment as described above. In some examples, the electronic device 101 applies the edge enhancement techniques in accordance with a user-defined setting, such as a setting that selects the visual effects for the electronic device 101 to apply to enhanced visibility images of the physical environment of the electronic device. In some examples, in situations in which the electronic device 101 applies edge enhancement to some objects in the image 808 but not to other objects in the image 808, the electronic device 101 applies other techniques, such as adjusting color tone, saturation, contrast, and/or sharpness, to portions of the image including objects to which the electronic device 101 applies edge enhancement and to portions of the image not including objects to which the electronic device 101 applies edge enhancement.

Figure 9:
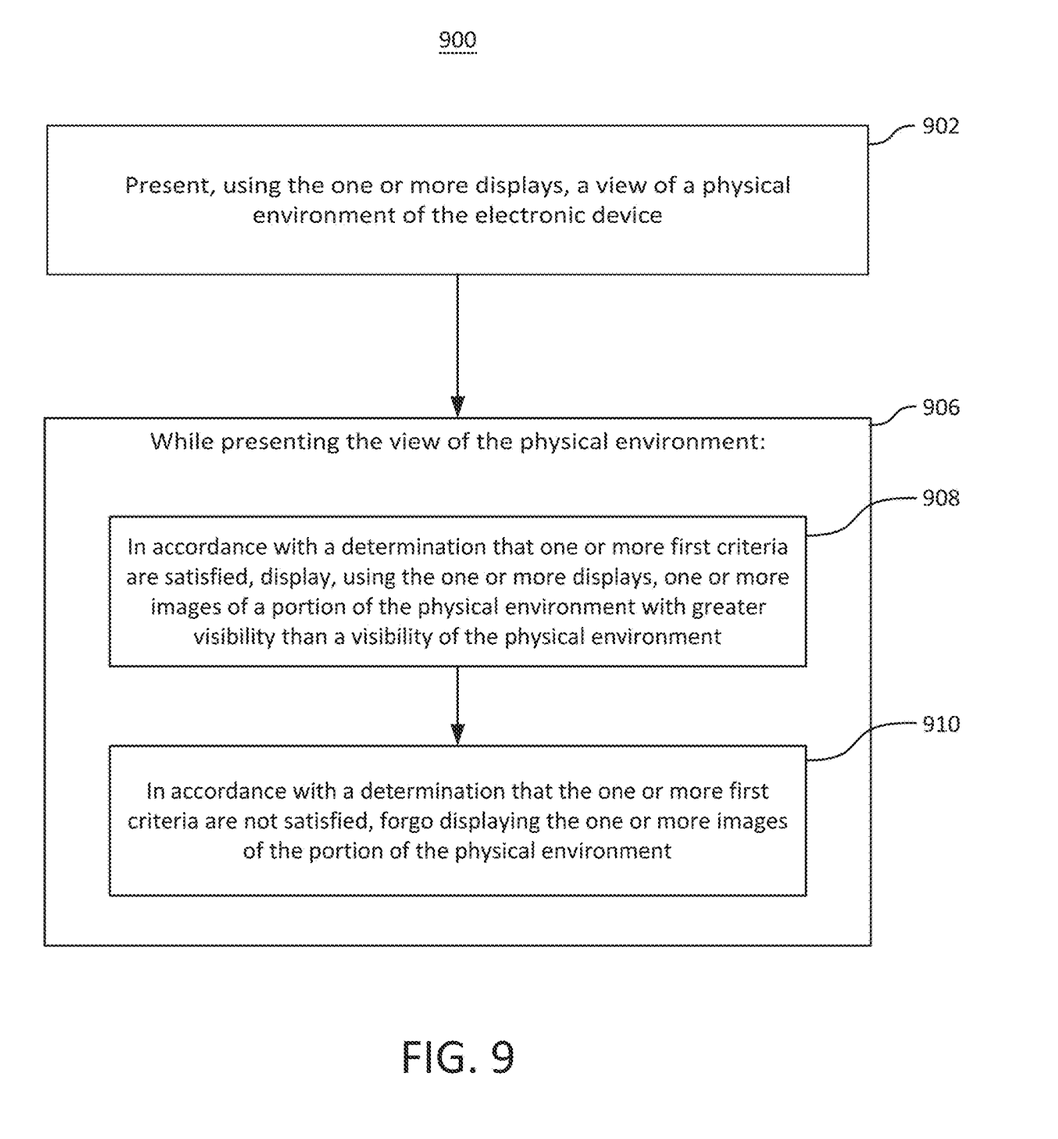
FIG. 9 illustrates an example method of selectively displaying an image of a portion of a physical environment of an electronic device according to some examples of the disclosure.

FIG. 9 illustrates an example method 900 of selectively displaying an image of a portion of a physical environment of an electronic device 101 according to some examples of the disclosure. In some examples, the electronic device 101 performs method 900 in accordance with one or more techniques described above with reference to FIGS. 3A-8.

In some examples, method 900 includes presenting (902), using the one or more displays, a view of a physical environment of the electronic device. For example, FIGS. 3A-3B, 4, 5, 6, 7, and 8 include views of physical environment 300, 400, 500, 600, 700, and 800 respectively, as described in more detail above.

In some examples, method 900 includes, while presenting the view of the physical environment (906), as described above, in accordance with a determination that one or more first criteria are satisfied, displaying (908), using the one or more displays, one or more images of a portion of the physical environment with greater visibility than a visibility of the physical environment. For example, in FIGS. 3A-3B, FIG. 4, FIG. 7, and FIG. 8 the electronic device 101 displays image 308, image 408, image 708, and image 808 respectively.

In some examples, method 900 includes, while presenting the view of the physical environment (906), as described above, in accordance with a determination that the one or more first criteria are not satisfied, forgoing (910) displaying the one or more images of the portion of the physical environment. For example, in FIG. 6, the electronic device 101 forgoes displaying an image similar to image 308 or image 408.

Additionally or alternatively, in some examples, the one or more first criteria include a criterion that is satisfied when the electronic device receives, using one or more input devices, an input corresponding to a request to display the one or more images of the portion of the physical environment. Additionally or alternatively, in some examples, the one or more first criteria include a criterion that is satisfied in response to sensing, using one or more sensors, data indicative of a first context of the physical environment, wherein the criterion is not satisfied in response to sensing, using the one or more sensors, data indicative of a second context of the physical environment different from the first context. Additionally or alternatively, in some examples, displaying the one or more images of the portion of the physical environment comprises: in accordance with a determination that one or more second criteria are satisfied different from the one or more first criteria, displaying the one or more images with a first amount of fidelity and a first frame rate; and in accordance with a determination that one or more third criteria are satisfied different from the one or more first criteria and different from the one or more second criteria, displaying the one or more images with a second amount of fidelity less than the first amount of fidelity and with a second frame rate greater than the first frame rate. Additionally or alternatively, in some examples, the one or more second criteria include a criterion that is satisfied when the electronic device senses, using an inertial measurement unit (IMU), first motion data indicative of movement less than a threshold amount of movement and the one or more third criteria include a criterion that is satisfied when the electronic device senses, using the IMU, second motion data indicative of movement that is not less than the threshold amount of movement. Additionally or alternatively, in some examples, the one or more second criteria include a criterion that is satisfied when the electronic device senses, using a gaze tracking device, first gaze data and the one or more third criteria include a criterion that is satisfied when the electronic device senses, using the gaze tracking device, second gaze data different from the first gaze data. Additionally or alternatively, in some examples, the one or more second criteria include a criterion that is satisfied when the electronic device senses, using one or more sensors, data indicative of a first context of the physical environment and the one or more third criteria include a criterion that is satisfied when the electronic device senses, using one or more sensors, data indicative of a second context of the physical environment different from the first context of the physical environment. Additionally or alternatively, in some examples, displaying the one or more images of the portion of the physical environment includes displaying, using the one or more displays, a selectable option that, when selected, causes the electronic device to adjust a level of zoom of the one or more images of the portion of the physical environment. Additionally or alternatively, in some examples, displaying the one or more images of the portion of the physical environment includes displaying the one or more images of the portion of the physical environment with a first brightness, and the method further includes: while presenting the view of the physical environment, in accordance with the determination that the one or more first criteria are not satisfied, including a criterion that is satisfied when a level of ambient light of the physical environment is less than a threshold amount: displaying, using the one or more displays, a user interface element different from the one or more images of the portion of the physical environment at a second brightness greater than the first brightness. Additionally or alternatively, in some examples, method 900 includes while presenting the physical environment, displaying, using the one or more displays, a user interface of a camera application that includes a second image of the portion of the physical environment different from the one or more images of the portion of the environment, wherein: the one or more images of the portion of the environment have a greater visibility than the second image. Additionally or alternatively, in some examples, displaying the one or more images includes applying one or more image processing techniques to the one or more images to a greater extent than an extent to which the one or more image processing techniques are applied to the second image when displaying the second image. Additionally or alternatively, in some examples, the one or more images are displayed outside of the user interface of the camera application. Additionally or alternatively, in some examples, method 900 includes while presenting the view of the physical environment: in accordance with a determination that one or more fourth criteria are satisfied, displaying, using the one or more displays, visual indications of edges of one or more physical objects in the physical environment overlaid on the view of the physical environment at respective locations of the edges of the one or more physical objects. Additionally or alternatively, in some examples, the one or more images include video. Additionally or alternatively, in some examples, presenting the view of the physical environment includes presenting an extended reality environment based on the physical environment. Additionally or alternatively, in some examples, displaying the one or more images of the portion of the physical environment comprises displaying the one or more images overlaid on the view of the physical environment at a respective location of the portion of the physical environment.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

What is claimed is:

1. A method comprising:
   at an electronic device in communication with one or more displays:
      presenting, using the one or more displays, a view of a physical environment of the electronic device;
      while presenting the view of the physical environment:
         in accordance with a determination that one or more first criteria are satisfied, wherein the one or more first criteria include a criterion that is satisfied when a level of ambient light of the physical environment is below a threshold amount of ambient light, displaying, using the one or more displays, one or more images of a portion of the physical environment; and
         in accordance with a determination that the one or more first criteria are not satisfied, forgoing displaying the one or more images of the portion of the physical environment.

2. The method of claim 1, wherein the one or more first criteria include a criterion that is satisfied in response to sensing, using one or more sensors, data indicative of a first context of the physical environment, wherein the criterion is not satisfied in response to sensing, using the one or more sensors, data indicative of a second context of the physical environment different from the first context.

3. The method of claim 1, wherein displaying the one or more images of the portion of the physical environment comprises:
  in accordance with a determination that one or more second criteria are satisfied different from the one or more first criteria, displaying the one or more images with a first amount of fidelity and a first frame rate; and
  in accordance with a determination that one or more third criteria are satisfied different from the one or more first criteria and different from the one or more second criteria, displaying the one or more images with a second amount of fidelity less than the first amount of fidelity and with a second frame rate greater than the first frame rate.

4. The method of claim 1, further comprising:
  while presenting the physical environment,
    displaying, using the one or more displays, a user interface of a camera application that includes a second image of the portion of the physical environment different from the one or more images of the portion of the environment, wherein:
      the one or more images of the portion of the environment have a greater visibility than the second image.

5. The method of claim 1, further comprising:
  while presenting the view of the physical environment:
    in accordance with a determination that one or more fourth criteria are satisfied, displaying, using the one or more displays, visual indications of edges of one or more physical objects in the physical environment overlaid on the view of the physical environment at respective locations of the edges of the one or more physical objects.

6. The method of claim 1, wherein presenting the view of the physical environment includes presenting an extended reality environment based on the physical environment.

7. The method of claim 1, wherein displaying the one or more images of the portion of the physical environment comprises displaying the one or more images overlaid on the view of the physical environment at a respective location of the portion of the physical environment.

8. The method of claim 1, wherein displaying the one or more images of the portion of the physical environment comprises displaying the one or more images with a color filter that enhances one or more first colors in the one or more images relative to one or more second colors in the one or more images.

9. An electronic device comprising:
  memory; and
  one or more processors coupled to memory and configured to perform a method comprising:
    presenting, using one or more displays, a view of a physical environment of the electronic device;
    while presenting the view of the physical environment:
      in accordance with a determination that one or more first criteria are satisfied, wherein the one or more first criteria include a criterion that is satisfied when a level of ambient light of the physical environment is below a threshold amount of ambient light, displaying, using the one or more displays, one or more images of a portion of the physical environment; and
      in accordance with a determination that the one or more first criteria are not satisfied, forgoing displaying the one or more images of the portion of the physical environment.

10. The electronic device of claim 9, wherein the one or more first criteria include a criterion that is satisfied in response to sensing, using one or more sensors, data indicative of a first context of the physical environment, wherein the criterion is not satisfied in response to sensing, using the one or more sensors, data indicative of a second context of the physical environment different from the first context.

11. The electronic device of claim 9, wherein displaying the one or more images of the portion of the physical environment comprises:
  in accordance with a determination that one or more second criteria are satisfied different from the one or more first criteria, displaying the one or more images with a first amount of fidelity and a first frame rate; and
  in accordance with a determination that one or more third criteria are satisfied different from the one or more first criteria and different from the one or more second criteria, displaying the one or more images with a second amount of fidelity less than the first amount of fidelity and with a second frame rate greater than the first frame rate.

12. The electronic device of claim 9, wherein the method further comprises:
  while presenting the physical environment,
    displaying, using the one or more displays, a user interface of a camera application that includes a second image of the portion of the physical environment different from the one or more images of the portion of the environment, wherein:
      the one or more images of the portion of the environment have a greater visibility than the second image.

13. The electronic device of claim 9, wherein the method further comprises:
  while presenting the view of the physical environment:
    in accordance with a determination that one or more fourth criteria are satisfied, displaying, using the one or more displays, visual indications of edges of one or more physical objects in the physical environment overlaid on the view of the physical environment at respective locations of the edges of the one or more physical objects.

14. The electronic device of claim 9, wherein presenting the view of the physical environment includes presenting an extended reality environment based on the physical environment.

15. The electronic device of claim 9, wherein displaying the one or more images of the portion of the physical environment comprises displaying the one or more images overlaid on the view of the physical environment at a respective location of the portion of the physical environment.

16. The electronic device of claim 9, wherein displaying the one or more images of the portion of the physical environment comprises displaying the one or more images with a color filter that enhances one or more first colors in the one or more images relative to one or more second colors in the one or more images.

17. A non-transitory computer readable storage medium storing instructions that, when executed by an electronic device, cause the electronic device to perform a method comprising:
　presenting, using one or more displays, a view of a physical environment of the electronic device;
　while presenting the view of the physical environment:
　　in accordance with a determination that one or more first criteria are satisfied, wherein the one or more first criteria include a criterion that is satisfied when a level of ambient light of the physical environment is below a threshold amount of ambient light, displaying, using the one or more displays, one or more images of a portion of the physical environment; and
　　in accordance with a determination that the one or more first criteria are not satisfied, forgoing displaying the one or more images of the portion of the physical environment.

18. The non-transitory computer readable storage medium storing instructions of claim 17, wherein the one or more first criteria include a criterion that is satisfied in response to sensing, using one or more sensors, data indicative of a first context of the physical environment, wherein the criterion is not satisfied in response to sensing, using the one or more sensors, data indicative of a second context of the physical environment different from the first context.

19. The non-transitory computer readable storage medium storing instructions of claim 17, wherein displaying the one or more images of the portion of the physical environment comprises:
　in accordance with a determination that one or more second criteria are satisfied different from the one or more first criteria, displaying the one or more images with a first amount of fidelity and a first frame rate; and
　in accordance with a determination that one or more third criteria are satisfied different from the one or more first criteria and different from the one or more second criteria, displaying the one or more images with a second amount of fidelity less than the first amount of fidelity and with a second frame rate greater than the first frame rate.

20. The non-transitory computer readable storage medium storing instructions of claim 17, wherein the method further comprises:
　while presenting the physical environment,
　　displaying, using the one or more displays, a user interface of a camera application that includes a second image of the portion of the physical environment different from the one or more images of the portion of the environment, wherein:
　　　the one or more images of the portion of the environment have a greater visibility than the second image.

21. The non-transitory computer readable storage medium storing instructions of claim 17, wherein the method further comprises:
　while presenting the view of the physical environment:
　　in accordance with a determination that one or more fourth criteria are satisfied, displaying, using the one or more displays, visual indications of edges of one or more physical objects in the physical environment overlaid on the view of the physical environment at respective locations of the edges of the one or more physical objects.

22. The non-transitory computer readable storage medium storing instructions of claim 17, wherein presenting the view of the physical environment includes presenting an extended reality environment based on the physical environment.

23. The non-transitory computer readable storage medium storing instructions of claim 17, wherein displaying the one or more images of the portion of the physical environment comprises displaying the one or more images overlaid on the view of the physical environment at a respective location of the portion of the physical environment.

24. The non-transitory computer readable storage medium storing instructions of claim 17, wherein displaying the one or more images of the portion of the physical environment comprises displaying the one or more images with a color filter that enhances one or more first colors in the one or more images relative to one or more second colors in the one or more images.

* * * * *